US009778895B2

(12) United States Patent
Bluvband et al.

(10) Patent No.: US 9,778,895 B2
(45) Date of Patent: Oct. 3, 2017

(54) SYSTEMS, DEVICES, COMPONENTS AND ASSOCIATED COMPUTER EXECUTABLE CODE FOR PROVIDING REMOTE VIEWING OF A DISPLAY ASSOCIATED WITH A COMPUTATIONAL DEVICE

(71) Applicant: A.L.D. ADVANCED LOGISTICS DEVELOPMENT LTD., Tel Aviv (IL)

(72) Inventors: Zigmund Bluvband, Rishon LeZion (IL); Ronen Shtainkort, Rishon LeZion (IL)

(73) Assignee: A.L.D. ADVANCED LOGISTICS DEVELOPMENT LTD., Tel Aviv (IL)

( * ) Notice: Subject to any disclaimer, the term of this patent is extended or adjusted under 35 U.S.C. 154(b) by 6 days.

(21) Appl. No.: 14/720,854

(22) Filed: May 25, 2015

(65) Prior Publication Data

US 2016/0350054 A1    Dec. 1, 2016

(51) Int. Cl.
| | | |
|---|---|---|
| G06F 3/14 | (2006.01) | |
| G06F 1/16 | (2006.01) | |
| G06F 3/041 | (2006.01) | |
| G06F 3/0484 | (2013.01) | |
| H04M 1/02 | (2006.01) | |
| H04M 1/725 | (2006.01) | |

(52) U.S. Cl.
CPC .......... *G06F 3/1454* (2013.01); *G06F 1/1601* (2013.01); *G06F 1/1603* (2013.01); *G06F 1/1637* (2013.01); *G06F 1/1654* (2013.01); *G06F 3/0416* (2013.01); *G06F 3/04842* (2013.01); *G06F 2203/0383* (2013.01); *H04M 1/0266* (2013.01); *H04M 1/7253* (2013.01)

(58) Field of Classification Search
USPC ..................................................... 348/333.01
See application file for complete search history.

(56) References Cited

U.S. PATENT DOCUMENTS 7,654,029 B2 *   2/2010   Peters ..................... F41G 1/473
                                                      356/11
9,195,067 B1 *  11/2015   Heinrich .............. G02B 27/017
(Continued)

OTHER PUBLICATIONS

Tactical Electronics, Monocular Micro Viewer, https://web.archive.org/web/20150308235507/http://www.tacticalelectronics.com/product/monocular-micro-viewer/.*

(Continued)

*Primary Examiner* — Antoinette Spinks
(74) *Attorney, Agent, or Firm* — Vladimir Sherman; Professional Patent Solutions

(57) ABSTRACT

According to some embodiments of the present invention, there may be provided one or more remote display viewing units functionally associated with one or more computational devices. A remote display viewing unit (RDVU) may include a screen and/or other form of displaying component (e.g. retinal projection mechanism) adapted to present to a user a portion and/or complete display of an associated computing device display/screen, Graphic User Interface (GUI), and/or any other graphically rendered data relating to the device. According to further embodiments, a RDVU may include shading components adapted to prevent and/or mitigate exterior lighting/sunshine interference with viewing the remote screen and/or displaying component. For example, the RDVU may include a visor type component.

15 Claims, 9 Drawing Sheets

(56) References Cited

U.S. PATENT DOCUMENTS

2013/0044042 A1\* 2/2013 Olsson ............... G02B 27/0176
345/8
2016/0061567 A1\* 3/2016 Regan .................... G02B 23/10
42/119
2017/0061813 A1\* 3/2017 Tao .......................... G09B 9/08

OTHER PUBLICATIONS

Tactical Electronics, Monocular Micro Viewer, http://www.tacticalelectronics.com/product/monocular-micro-viewer/.\*

\* cited by examiner

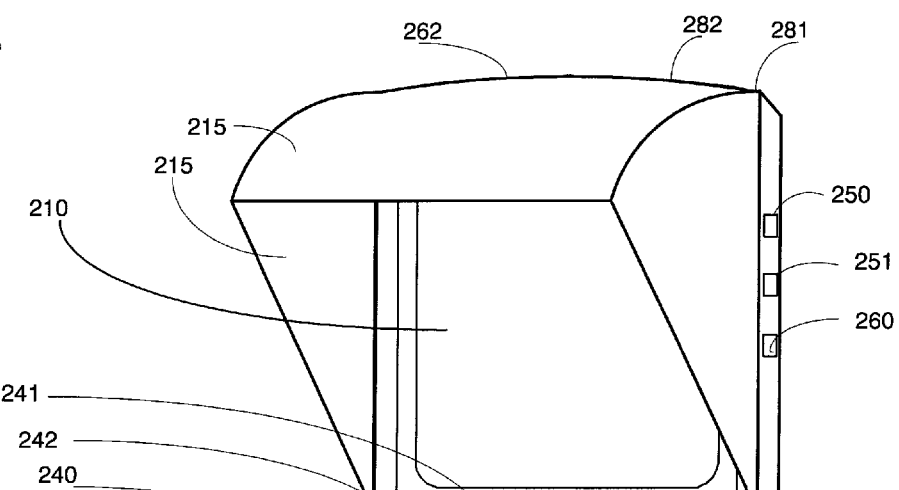
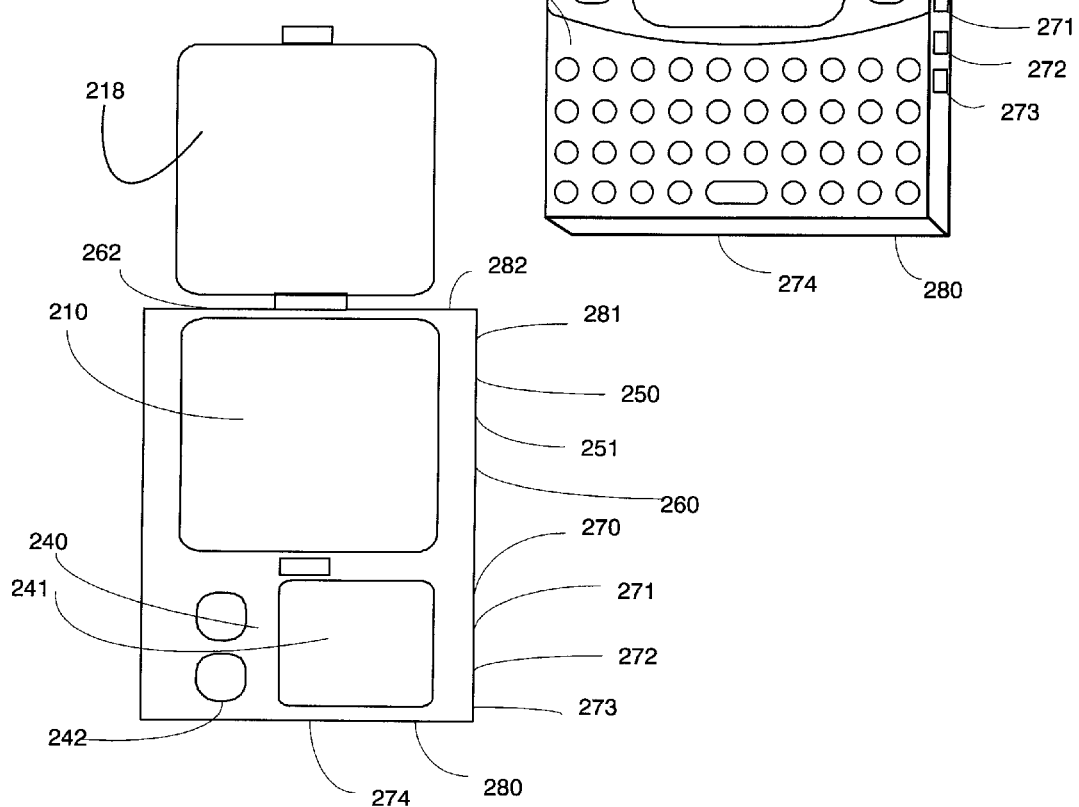

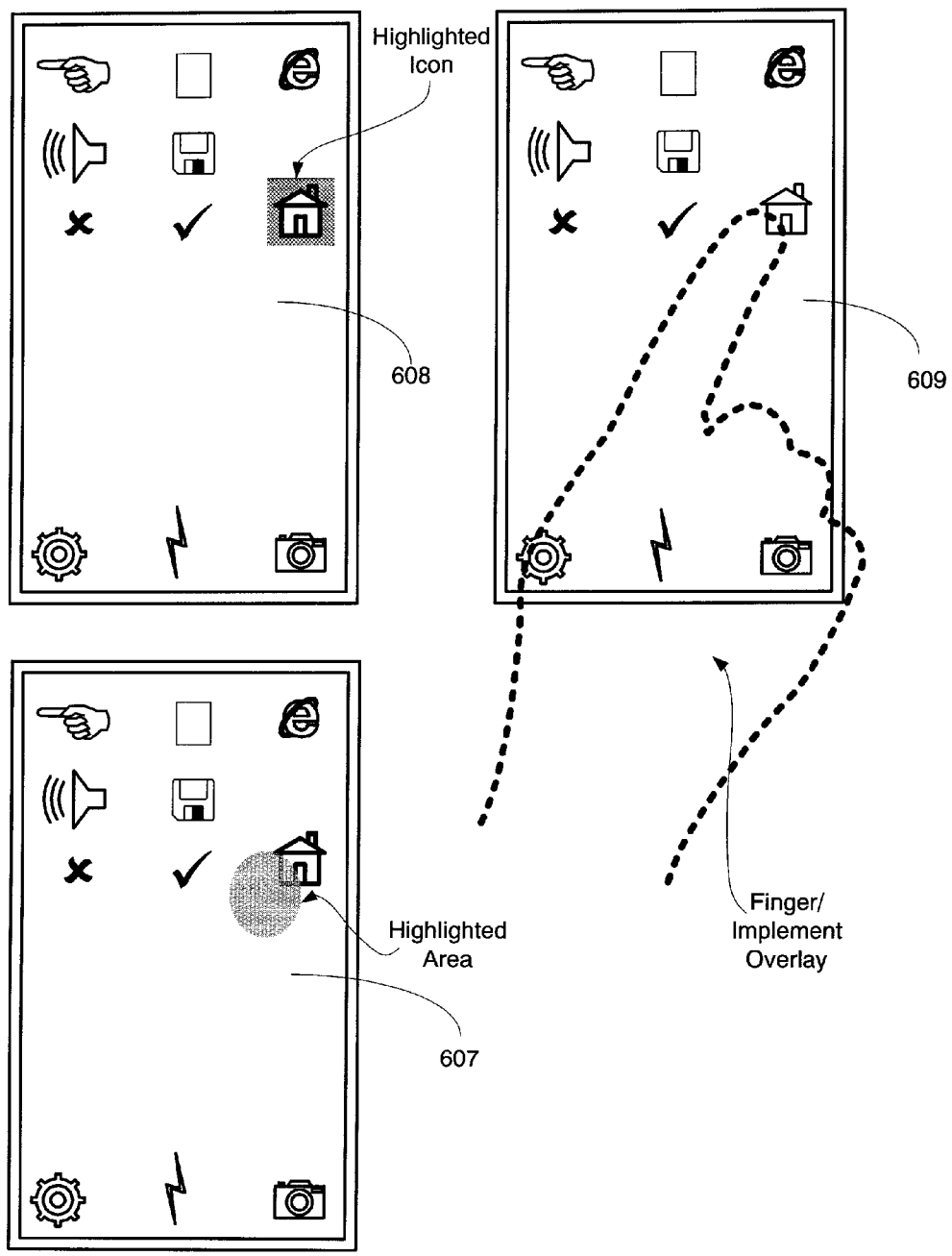

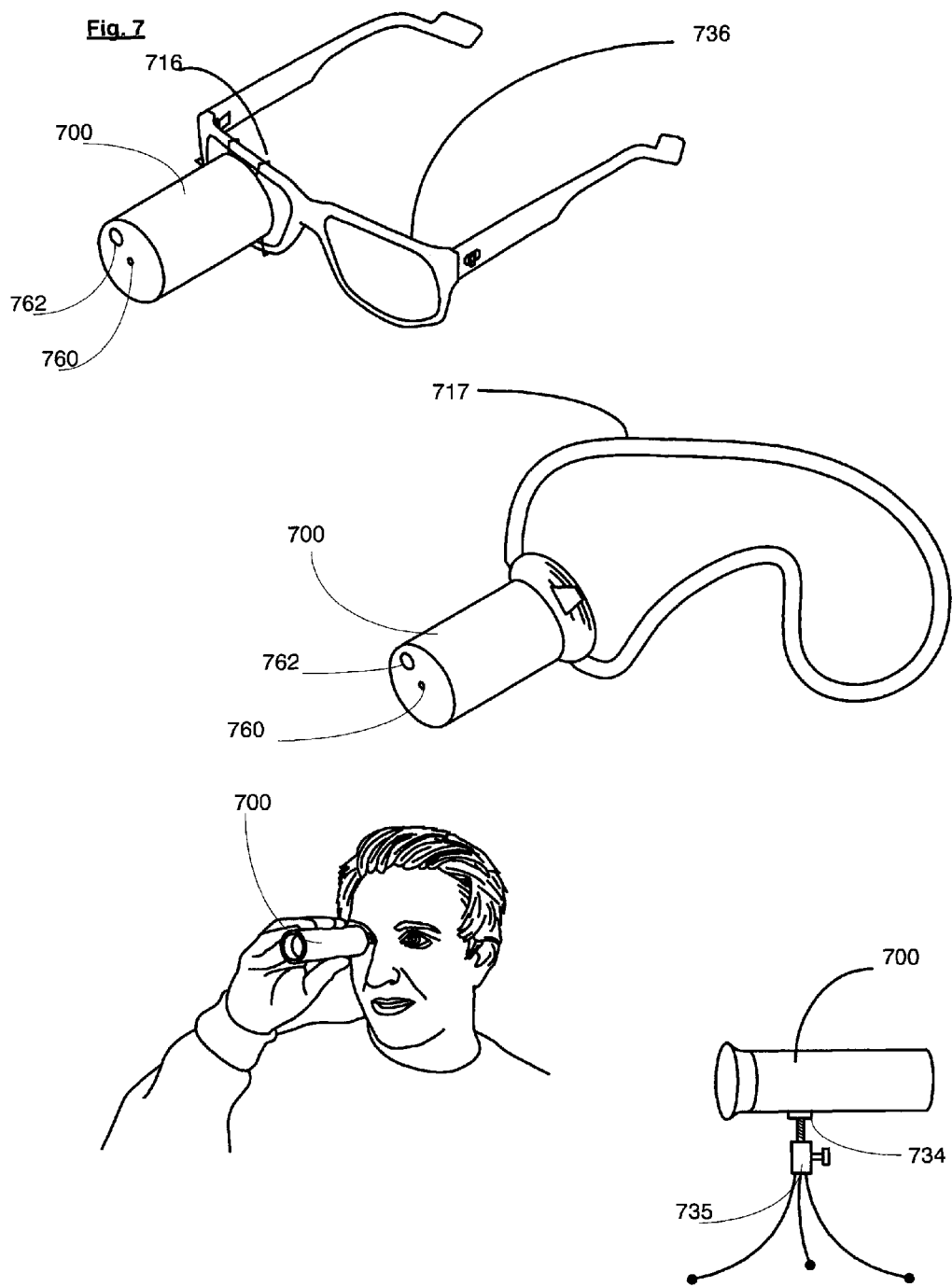

SYSTEMS, DEVICES, COMPONENTS AND ASSOCIATED COMPUTER EXECUTABLE CODE FOR PROVIDING REMOTE VIEWING OF A DISPLAY ASSOCIATED WITH A COMPUTATIONAL DEVICE

FIELD OF THE INVENTION

The present invention generally relates to the field of mobile electronic devices. More specifically, the present invention relates to systems, devices, components and associated computer executable code for providing remote viewing of a display associated with a computational device.

BACKGROUND

Glare is difficulty seeing in the presence of bright light such as direct or reflected sunlight or artificial light such as strong or misaligned lighting or car headlamps at night. Glare is caused by a significant ratio of luminance between the task, that which is being looked at, for example a screen of a computational device, and the glare source for example the Sun. Factors such as the angle between the task and the glare source and eye adaptation have significant impacts on the experience of glare. Glare has been known to be a serious obstacle when using computational devices (e.g. smartphones) outdoors.

In modern times, however, people use computational devices, such as smartphones, at all times, indoors and outdoors. Therefore, in today's world, the use of a computational device outdoors is a day to day occurrence. Thus, the problem of using a computational device, and primarily viewing its display, in sunlight, is an everyday problem almost every person in western society is forced to deal with on a daily basis. The problem is especially acute when the interface of the device is a graphic user interface, such that it is necessary to view the device display in order to operate the device. Almost every person has encountered this difficulty, which, in extremely bright sunlight, becomes nearly impossible to overcome.

An eyepiece is a type of lens that is attached to a variety of optical devices such as microscopes. It is so named because it is usually the lens that is closest to the eye when someone looks through the device. The objective (the objective is the optical element that gathers light from the object being observed and focuses the light rays to produce a real image) lens or mirror collects light and brings it to focus creating an image. The eyepiece is placed near the focal point of the objective to magnify this image. The amount of magnification depends on the focal length (which is a measure of how strongly the system converges or diverges light) of the eyepiece.

SUMMARY OF THE INVENTION

According to some embodiments of the present invention, there may be provided one or more remote display viewing units functionally associated with one or more computational devices. A remote display viewing unit (RDVU) may include a screen and/or other form of displaying component (e.g. retinal projection mechanism) adapted to present to a user a portion and/or complete display of an associated computational device display/screen, Graphic User Interface (GUI), and/or any other graphically rendered data relating to the device. According to further embodiments, a RDVU may include shading components adapted to prevent and/or mitigate exterior lighting/sunshine interference with viewing the remote screen and/or displaying component. For example, the RDVU may include a visor type component.

It should be understood that the present invention may be implemented in relation to any computational device. For the sake of convenience, many of the descriptions herein refer to a mobile phone. These descriptions, however, should be understood to equally relate, with the relevant modifications, to any computational device.

According to some embodiments, a RDVU, or portion thereof, may be designed in the form of an eyepiece, jewelers loupe or similar type design (hereinafter referred to as a "Eyepiece Remote Viewer" or "ERV"), wherein the screen/display may be positioned substantially on the opposite side of the ERV from the viewers' eye, or otherwise disposed to be viewed by a user placing his/her eye at the appropriate location at one end. An ERV may be covered or otherwise isolated from light between the viewer's eyes and the screen. For example, a RDVU may be shaped in tunnel-like form, similar to cameras' viewfinders.

According to some embodiments, a RDVU, or a portion thereof, may be comprised of a screen mounted on a handheld device, with or without a shading element (e.g. visor), a binocular type arrangement, glasses, an accessory adapted to fit onto eye-glasses and/or any other suitable physical form.

According to some embodiments, a RDVU may further include mounting and/or wearing components designed to allow the RDVU to be worn/positioned in front of a user's eye without holding it. For example, a RDVU may include a head strap, a connector for glasses, etc. According to further embodiments, a RDVU may include adaptations to allow it to be physically attached to an associated computational device (e.g. a Velcro strip).

According to some embodiments, an ERV may include one or more optical elements designed to facilitate viewing of the display of an ERV, e.g. mirrors, lenses, diaphragms, filters, etc.

According to some embodiments, a RDVU may comprise one or more display components (e.g. a screen) and may further comprise one or more Optical elements (e.g. a lens) designed to facilitate and/or improve the display of the RDVU. For example, a RDVU may include an adjustable lens for controlling the sharpness and/or increasing the size of an image displayed on the RDVU.

According to some embodiments, a RDVU may comprise one or more detachable, interchangeable and/or adjustable optical components. For example, a RDVU may include interchangeable/adjustable optical filters.

According to further embodiments, a RDVU may comprise physical control elements (e.g. buttons, dials, knobs, touchpads, switches, scroll wheels, levers and so on) designed to control the operation of the RDVU and/or associated computational device(s). According to yet further embodiments, a RDVU may comprise sensors for improving/adjusting/controlling its operation and function and/or providing an associated computational device data relevant to its operation (e.g. accelerometers, gyro meters, inclinometers, exterior light sensors, thermometers, etc). For example, a RDVU may include physical sensors designed to sense a position and orientation of the RDVU or the level of light in the environment of the RDVU.

According to some embodiments, a RDVU may include one or more image/sound sensors and associated hardware for augmenting the functionalities of an associated computational device. For example, a RDVU may include an image sensor designed such that an associated computational device can take pictures from the image sensor of the RDVU.

According to some embodiments an RDVU may comprise control elements designed to control operations of the RDVU and/or associated computational devices. Such control elements may be implemented as hardware, a graphical user interface (GUI), a combination thereof and/or both, and/or by any other type of control elements. A GUI of a RDVU may include informative icons, relating to the function of the RDVU and/or associated computational device(s). Such icons may be added to the display of the RDVU in addition to other data/images being displayed on the RDVU, e.g. as an overlay or a display along a border of the image/date. Hardware type control elements may be implemented as buttons, dials, switches, touchpads, scrolling wheels and/or any other known control element designs upon an exterior of an RDVU or as a separate device communicatively coupled to a RDVU. According to further embodiments there may be provided one or more physical control elements designed to interact with a GUI rendered on a display of the RDVU. For example, a RDVU may include a touchpad designed to control a pointer associated with a GUI appearing on a display of the RDVU. According to some embodiments, control elements of a RDVU may be programmable. According to further embodiments, a RDVU may be controlled from the computational device. According to yet further embodiments, a RDVU may be controlled by a GUI displayed upon the RDVU and interfaced with using one or more control elements upon the computational device or another separate device (e.g. a handheld control unit). For example, a RDVU may be controlled by the GUI of an associated cellular phone displayed upon the RDVU display using the touchscreen of the cellular phone. In such an embodiment, a semi-transparent overlay of the user implement (e.g. finger) interacting with the touchscreen may be displayed upon the GUI being displayed on the RDVU.

The set of controls of a computational device associated with a RDVU, or portions thereof, may remain active, may be modified and/or may be deactivated upon activation of an RDVU.

According to some embodiments, one or more of the control elements may be directly related to the RDVU features, for example a RDVU specific control element may be provided for selecting a split screen or picture in picture mode that display views from back and front image sensors.

According to further embodiments, a RDVU may be adapted to provide multiple different viewing formats for viewing one or more different displays. Viewing formats may include split screen, picture in picture, document viewing mode, webpage viewing mode, augmented reality, overlay of one or more displays (or portions thereof) upon one or more other displays. The displays may be received from multiple sources. Multiple displays may be associated with a single computational device, e.g. a camera viewer display with a display of the computational device GUI inserted in the corner.

Communications between a computational device and a RDVU may be via a wired communication link, wireless communication link (e.g. Bluetooth) and/or a data network.

According to some embodiments, a RDVU may be activated automatically, semi automatically and/or manually.

The RDVU's screen and/or display element may be of any form of display, flat, curved or comprised of any relevant 3-dimensional form. For example LED technology, OLEDS, retinal projection and/or any other display technology known today or be devised in the future.

According to some embodiments, a RDVU may include a memory, which may function as a buffer and/or be used for local storage.

A RDVU may comprise a power supply and/or may function on an exterior power supply. According to some embodiments a RDVU may adapted to receive power from an associated computational device (e.g. phone), by wired or wireless power connection and/or may recharge batteries from the associated device.

According to some embodiments, a RDVU may be adapted to communicate/pair with one or more associated computational devices (e.g. smartphones) and receive from the devices image data of the devices' native display and/or portions thereof. The RDVU may render the image data, portions thereof or images derived from the data upon its display. According to some embodiments, the computational device's (e.g. smartphone) screen may be deactivated as the RDVU is activated or placed upon the eye. According to further embodiments, an associated computational device may send the RDVU image data of a display intended only for the RDVU while the display of the computational device remains normal. For example, the RDVU screen may display a camera view while an associated cellphone remains on its home page.

According to some embodiments, the computational device may recognize the RDVU upon connection ("Plug & Play") and may further automatically deactivate the device's display.

According to some embodiments, the connection/activation of a RDVU to a given device may cause the given device to activate particular functions/applications/operating modes and associate it with the RDVU. For example, connection/activation of a RDVU may cause the activation of the device's camera function and what usually appears on the computational device's screen, will show on the RDVU screen utilizing its adjustable setup, for example, increased, with colors filtered etc.

According to some embodiments, a RDVU may include display characteristics different from an associated computational device (e.g. a higher resolution, 3D, panoramic). Accordingly, the display data may be fitted to the RDVU characteristics. For example, an image displayed on a smartphone may be displayed at one resolution on the phone display and another resolution on the RDVU display. A RDVU may include processing circuitry for modifying received display data to match the RDVU display characteristics, for deriving from received display data, display data for display upon the RDVU (e.g. augmented reality) and/or for modifying display data to match a particular desired display format of the RDVU (e.g. picture-in-picture). Such processing circuitry may, for example, generate a picture in picture display from two source image streams. Equally, or in addition, an associated computational device or software adapted to reside on such a device may perform some or all of the required processing, such that a RDVU may receive the display data ready or partially ready for display on the RDVU.

According to some embodiments, a RDVU and/or associated computational device may modify/select communication and/or display parameters based on user preferences and/or environmental conditions. For example, a resolution of the RDVU display may be modified to improve transmission rate in noisy environments. Such modifications may also be based on a current function being used. For example, in camera function a higher resolution may be used than in regular GUI mode. According to further embodiments, a RDVU and/or associated computational device may include a control element for modifying such parameters.

According to some embodiments, the computational device's control, or a portion thereof, may show, with or without other RDVU control elements, possibly in a GUI form.

A RDVU may include augmented reality functionalities. Augmented reality may be generated by processing circuitry of the RDVU, by processing circuitry of an associated computational device, a cloud based service and/or any combination thereof. A RDVU may include document viewing functionalities. Such functionalities may include a display designed to conveniently display a full sized page which enable the reader to complete reading the page without scrolling, similar to reading from a large screen. A RDVU may include webpage viewing functionalities. Such functionalities may include a display designed to conveniently display a full sized webpage which may enable the reader to review the page without scrolling, similar to reading from a large screen A computational device might be associated with one/or more RDVUs and one or more computational devices may be associated with one or more RDVUs. For example, using a split screen may present images from several associated devices.

A RDVU may be functionally associated with ancillary hardware for facilitating its function. For example, a RDVU may be functionally associated with an exterior interface unit (e.g. remote control). Such a remote may include one or more control elements for interfacing-with/controlling a RDVU and/or other associated computational devices. Such a remote control may function in conjunction with a GUI displayed on the associated RDVU and/or computational device. Such ancillary may be designed to be worn, e.g. as a wristwatch or necklace, etc.

According to some embodiments, a RDVU may further include a microphone, speaker/headphone and/or connections for such devices. Such ancillary devices may allow a RDVU to also be used as hands free speaking device (i.e. to speak through an associated computational device). Such devices may also be used for input (e.g. sound for a video being captured).

It should be understood that the present invention, on its three major components (e.g. the computational device, the RDVU and the separate command device), may be implemented in any configuration, interchangeably. For the sake of convenience, the descriptions herein refer to a computational device controlled by the RDVU and/or a separate command device. These descriptions, however, should be understood to equally relate, with the relevant modifications, to any hierarchical structure among the three.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 2A-2D are illustrations of exemplary remote display viewing units (RDVUs) in accordance with some embodiments of the present invention, wherein:

FIG. 2A illustrates an exemplary "PDA" style RDVU, in accordance with some embodiments of the present invention;

FIG. 2B illustrates an exemplary "Baseball Card" style RDVU, in accordance with some embodiments of the present invention;

FIG. 2C illustrates an exemplary "Binocular" style RDVU, in accordance with some embodiments of the present invention;

FIG. 2D illustrates an exemplary "Watch" style RDVU, in accordance with some embodiments of the present invention;

FIG. 5 includes illustrations of exemplary displays on a display of a RDVU, in accordance with some embodiments of the present invention, wherein:

Figure 1:
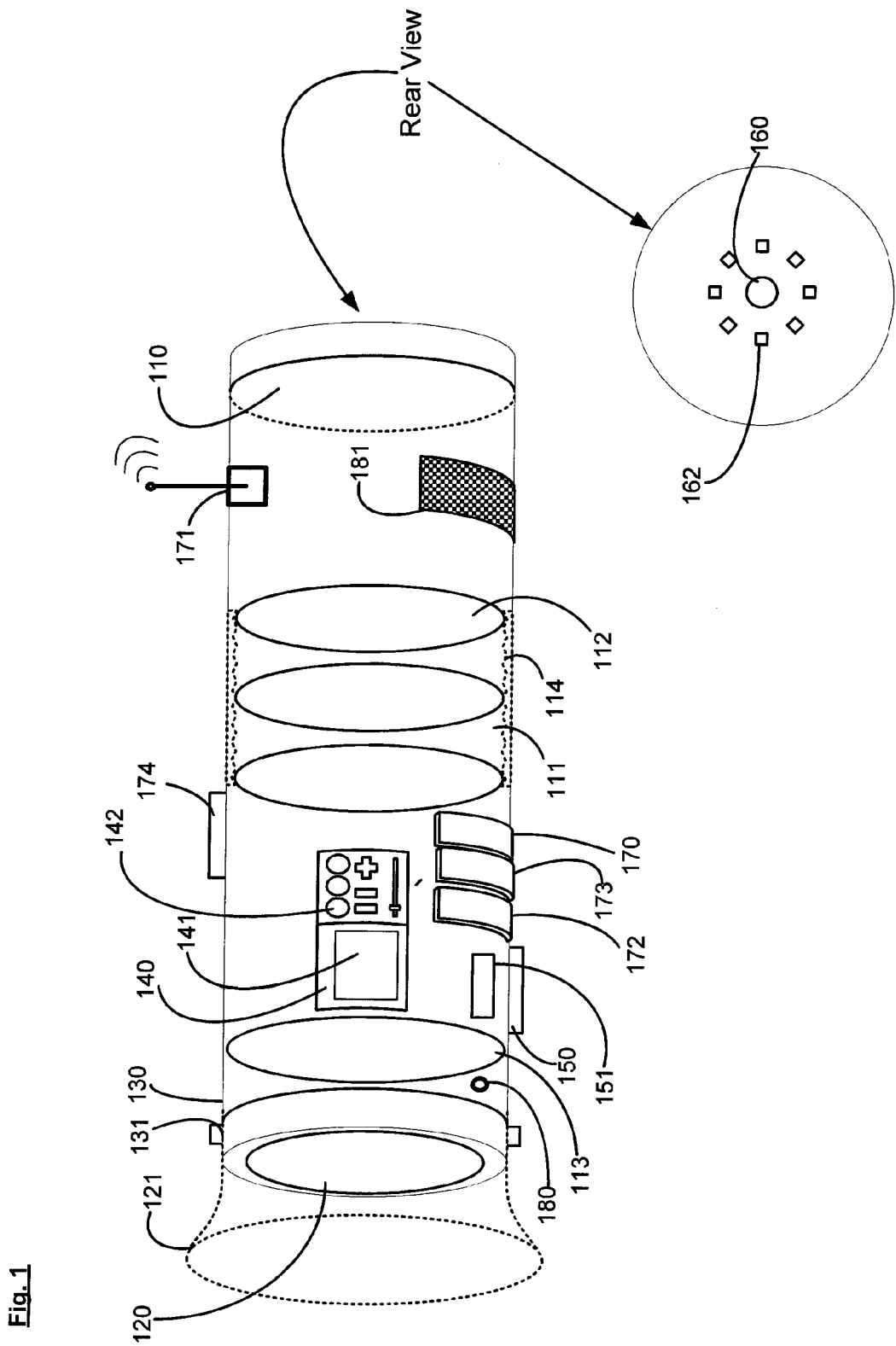
FIG. 1 is an illustration of an exemplary Eyepiece Remote Viewer (ERV), in accordance with some embodiments of the present invention.

506—shows an exemplary display of a RDVU in which a camera view of an associated computational device is displayed with RDVU related icons displayed on a banner on the side of the camera display, all in accordance with some embodiments of the present invention;

516—shows an exemplary split screen display of a RDVU (including display of Displays A and B displayed side by side), all in accordance with some embodiments of the present invention. In this particular illustration Display A is a camera view of an associated computational device and display B is a GUI of the associated computational device;

519—shows an exemplary picture in picture display of a RDVU (including display of Displays A and B displayed on in the other), all in accordance with some embodiments of the present invention. In this particular illustration Display A is a camera view of an associated computational device and display B is a GUI of the associated computational device;

FIG. 6 includes illustrations of exemplary displays on a display of a RDVU, demonstrating control of GUIs displayed on a RDVU and controlled by control elements on the RDVU, separate remote control or the associated computational device of the GUI, all in accordance with some embodiments of the present invention, wherein:

609—shows an exemplary display of a RDVU implementing an overlay of a control element/finger, all in accordance with some embodiments of the present invention;

608—shows an exemplary display of a RDVU implementing a highlighted icon control option, all in accordance with some embodiments of the present invention;

609—shows an exemplary display of a RDVU implementing a highlighted area control option, all in accordance with some embodiments of the present invention;

FIG. 7 includes illustrations of exemplary mounting implementations of a RDVU, in accordance with some embodiments of the present invention, wherein:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description herein. In addition, embodiments of the present invention are not described with reference to any particular programming language. It will be appreciated that a variety of programming languages may be used to implement the teachings of the inventions as described herein.

According to some embodiments of the present invention, there may be provided one or more remote display viewing units adapted to be functionally associated with one or more computational devices. A remote display viewing unit (RDVU—FIGS. 1, 2A-2D) may include a screen and/or other form of displaying component (e.g. retinal projection mechanism) adapted to present to a user a portion and/or complete display of an associated computing device display/screen, Graphic User Interface (GUI), and/or any other graphically rendered data relating to the device. According to further embodiments, a RDVU may include shading components (130, 230, 215 & 218) adapted to prevent and/or mitigate exterior lighting/sunshine interference with viewing the remote screen and/or displaying component and/or otherwise improve the viewability of a display associated with a computational device. For example, a RDVU may include a visor type component (215, 218).

It should be understood that the present invention may be implemented in relation to any computational device. For the sake of convenience, many of the descriptions herein refer to a mobile phone. These descriptions, however, should be understood to equally relate, with the relevant modifications, to any computational device.

According to some embodiments, a RDVU, or portion thereof, may be designed in the form of an eyepiece, jewelers loupe or similar type design (hereinafter referred to as a "Eyepiece Remote Viewer" or "ERV"—FIGS. 1 & 7, (also component 700).

Figure 2C:
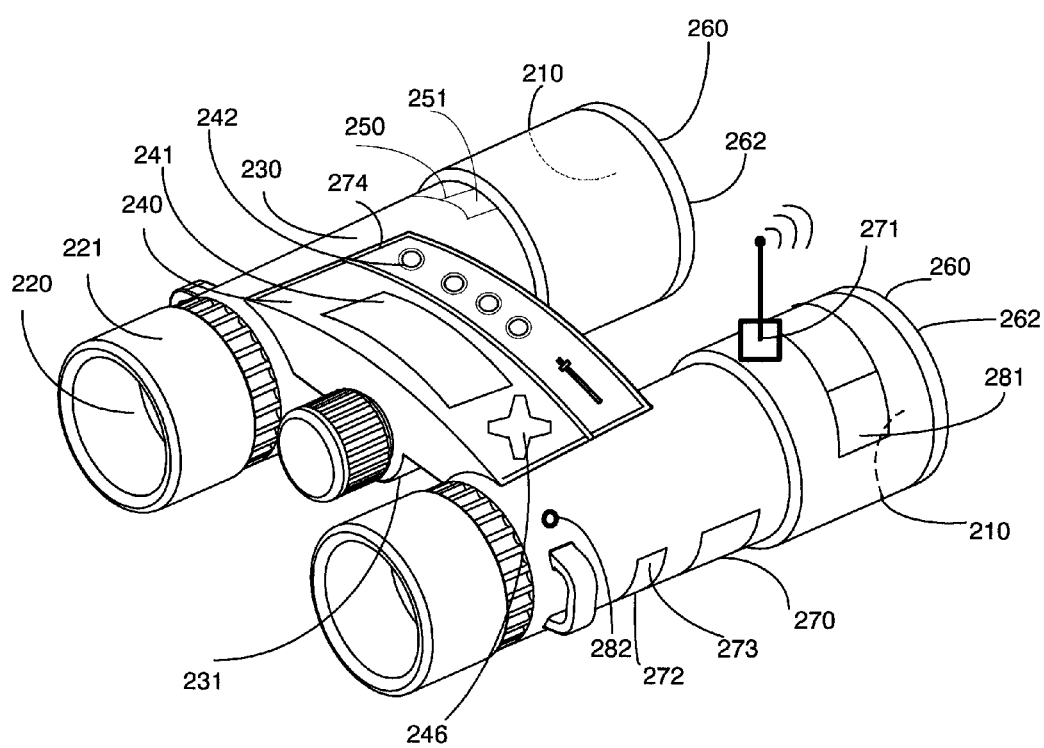
Figure 2D:
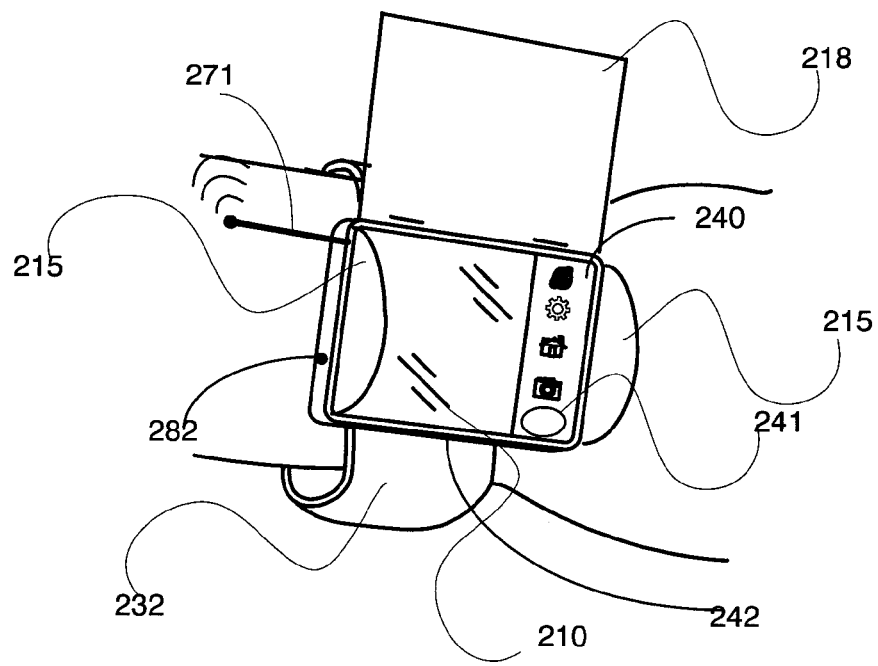
Figure 3:
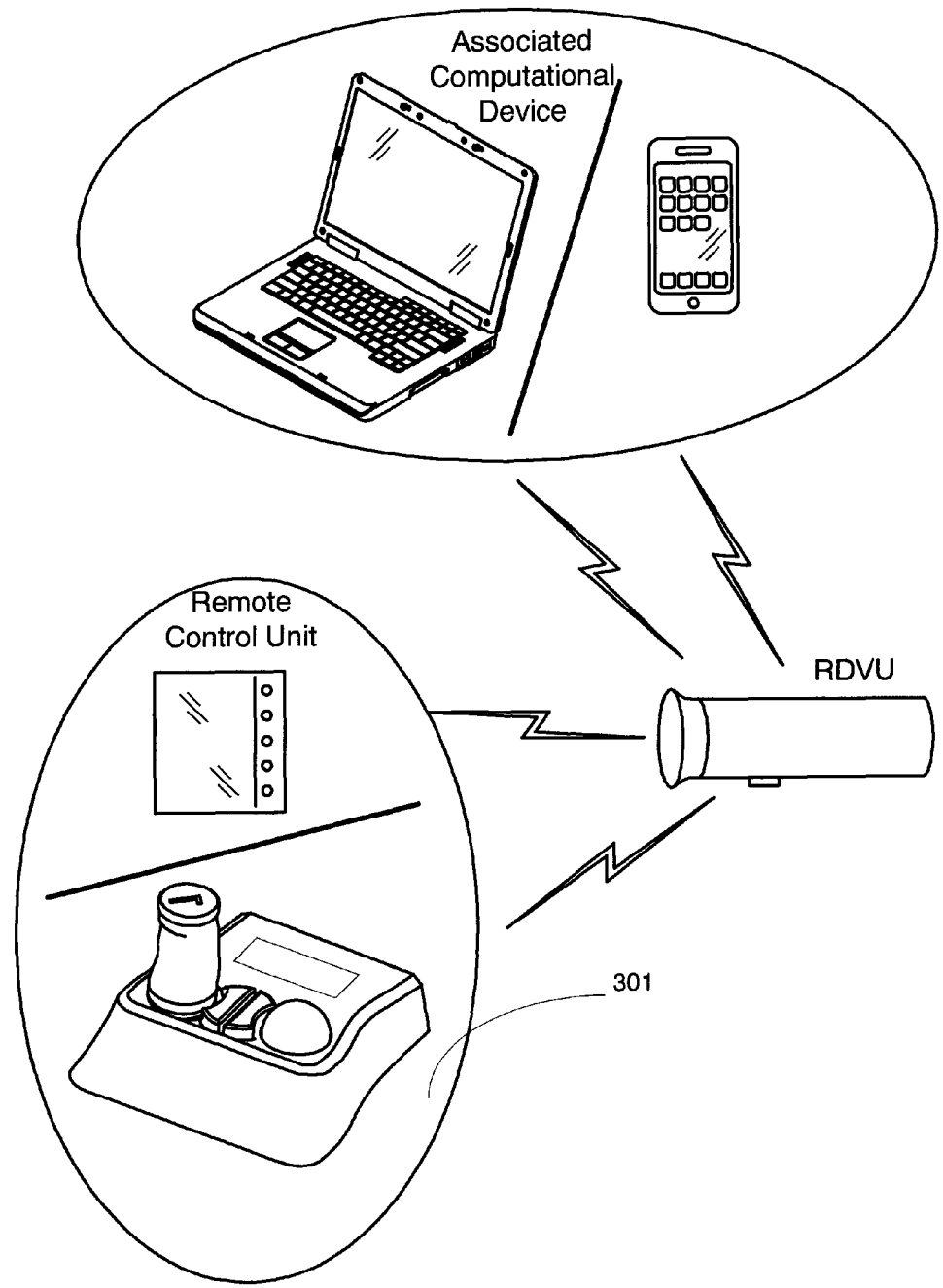
FIG. 3 is a functional illustration of an exemplary system for remote viewing of a display of a computational device, in accordance with some embodiments of the present invention.

An ERV may include a cover (130, 230, 215 & 218) or other form of physical component designed to isolate the viewer's eyes, the screen and the view of the screen from exterior lighting or other interferences. For example, an ERV may be shaped in tunnel-like form, similar to cameras' viewfinders. i.e. an ERV may be comprised of a closed cylinder (130, 230) with the display at one end and an aperture for viewing the display at the other end, as shown in FIG. 1 and FIG. 2C. In such a design, the view of the display through the aperture may be protected/isolated from exterior lighting.

According to some embodiments, an exemplary RDVU/ERV, as shown in FIGS. 1 and 2A-2D may include: (1) a display/screen [110, 210], (2) an aperture for viewing the display [120, 220], (3) one or more physical adaptations designed to accommodate a user's eye looking through the aperture (may be referred to as an eye mount) [121, 221] (e.g. a rubber eye pad), and/or (4) an enclosed cylinder/barrel [130, 230] between the aperture and the screen. As can be seen, when a user is viewing the display/screen through the aperture, the enclosed cylinder prevents exterior lighting from interfering with the user's viewing. An exemplary RDVU/ERV may further include: (5) user interface components [140, 240], including a touch pad [141, 241] and physical control elements [142, 242] (6) environmental sensors [150, 250] (e.g. light sensors), (7) one or more image sensor(s) [160, 260, 760], (8) one or more optical elements [111, 211], some of which may move [114, 214] (e.g. mirrors, lenses [112, 212], filters [113, 213]) (9) one or more gravitational/motion sensors (e.g. an accelerometer, a gyrometer, inclinometer) [151, 251] or other physical sensors, (10) image processing circuitry [170, 270], (11) communication circuitry and hardware [171, 271], (12) control circuitry [172, 272], (13) processing circuitry [173, 273] (14) a mount [131, 231], (15) a power supply [174, 274], (16) a microphone [180, 280], (17) a speaker [181, 281] (18) an earphone plug [182, 282], and/or (19) a light/flashlight [162, 262, 762].

A display/screen [110, 210]—A RDVU/ERV's screen and/or display element may be of any form of display, flat, curved or comprised of any relevant 3-dimensional form. For example LED technology, OLEDS, backlight, retinal projection and/or any other display technology known today or be devised in the future.

According to some embodiments, a RDVU/ERV may include a display having display characteristics different from an associated computational device (e.g. a higher resolution). Accordingly, the image(s)/data displayed on a RDVU/ERV may be fitted/modified to match RDVU/ERV display characteristics. For example, an image displayed on a smartphone may be displayed at one resolution on the phone display and at another resolution on a RDVU/ERV display. Similarly, a display may be enlarged or cropped to match a RDVU/ERV display. Modification of the display may be performed by the associated computational device sending the images/data and/or by image processing circuitry of the RDVU/ERV itself. According to further embodiments, resolution of image data may be modified (manually, semi-automatically or automatically) to accommodate faster communication and/or communication in problematic environments. According to some embodiments, an ERV may include a Screen and/or other type of display positioned substantially to one end of the tubular housing, opposite an aperture. A screen of a RDVU, (FIG. 5), may be configured to show side by side pictures [516] or a picture within a picture [519], information that may be collected from one or more computational devices and from the RDVU/ERV's camera, and/or any combination thereof. The screen may be flat or banded and use LED technology, backlight, or any other technology.

According to some embodiments, a RDVU/ERV may comprise one or more display components (e.g. screen, flat panel, etc) and may further comprise one or more optical elements [111] (e.g. lenses [112]) designed to facilitate and/or improve the display of a RDVU. For example, a RDVU may include an adjustable lens, (e.g. a moving lens [114]), for controlling the sharpness and/or increasing the size of an image displayed on a RDVU.

An aperture and physical adaptation [120, 121, 220 & 221]—According to some embodiments, an ERV (or other form of enclosed RDVU) may include an aperture located to allow isolated viewing of the screen, to allow a user to view the screen while the housing occludes exterior light. According to further embodiments, the aperture may be covered or surrounded by an eye mount [121, 221] adapted to facilitate a user's viewing through the aperture. An eye mount may be made of an appropriate material, for example, processed rubber or silicon, e.g. similar to an eye mount on a telescope or video camera. The material may be soft for a user's eye when pressed against it.

An enclosed housing (e.g. cylinder/barrel) [130, 230]—According to some embodiments, some types of a RDVU may comprise a enclosed housing (e.g. cylinder/barrel like body). In such RDVUs the display may be positioned within the housing. The housing may further include an aperture to allow a user to view the display within the housing, such that exterior interference is mitigated by the housing (See FIG. 1, 7, [700]). According to some embodiments including an enclosed housing, the housing may also serve as a mount for other elements of the RDVU (e.g. control elements, image sensor and/or environmental sensors, etc.).

User interface components/control elements [140, 240]—According to some embodiments, a RDVU may include one or more control elements/interface components. User interface components/control elements of a RDVU may be located on the exterior of the RDVU (see FIGS. 1 and 2A-2D) and/or upon a separate device (See FIG. 4).

Figure 5:
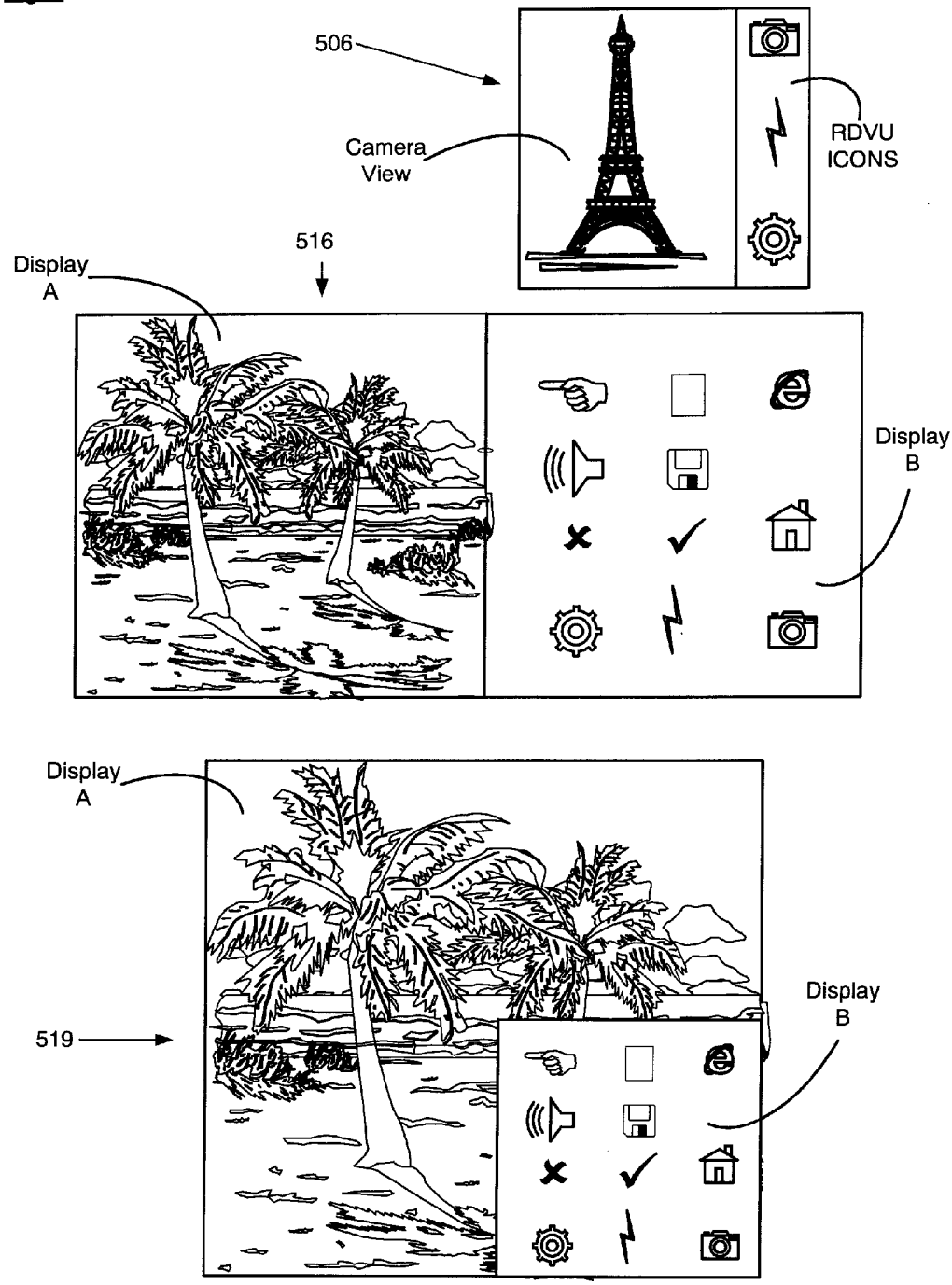

According to some embodiments an RDVU may comprise control elements designed to control operations of a RDVU and/or associated computational devices. Such control elements may be implemented as hardware, physical control elements [142, 242], a graphical user interface (GUI), a combination thereof and/or both, and/or by any other type of control elements. A GUI of a RDVU may include informative/control icons, relating to the function of a RDVU and/or associated computational device(s). Such icons may be added to the display of a RDVU in addition to other data/images being displayed on a RDVU, e.g. as an overlay or a display along a border of the image/data. For example an image from the computational device and a RDVU's GUI, as seen in FIG. 5.

Figure 4:
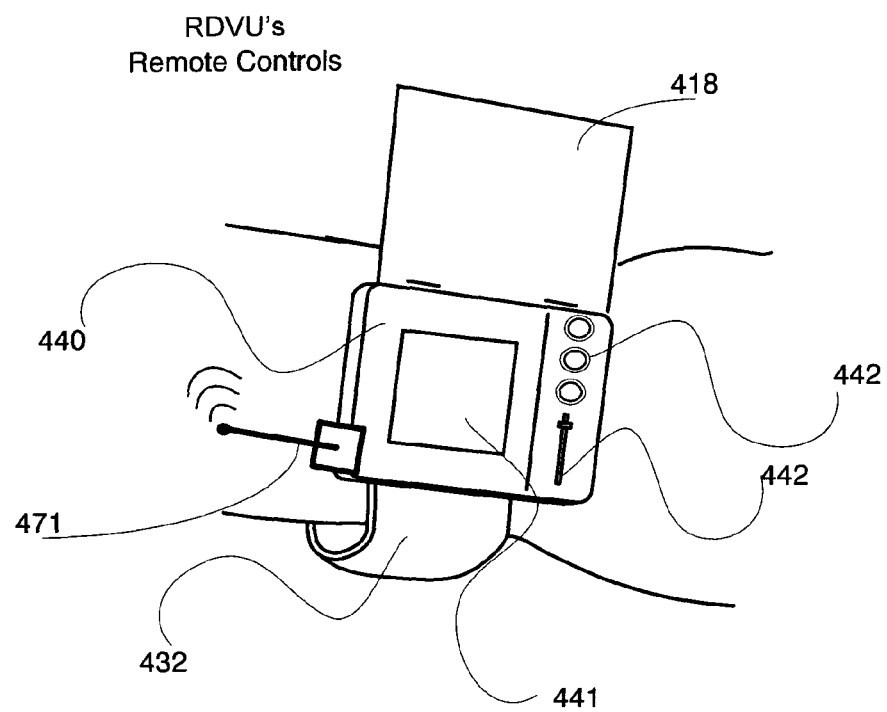
FIG. 4 includes illustrations of exemplary remote controls (separate interface units) for a RDVU, in accordance with some embodiments of the present invention.
Figure 4:
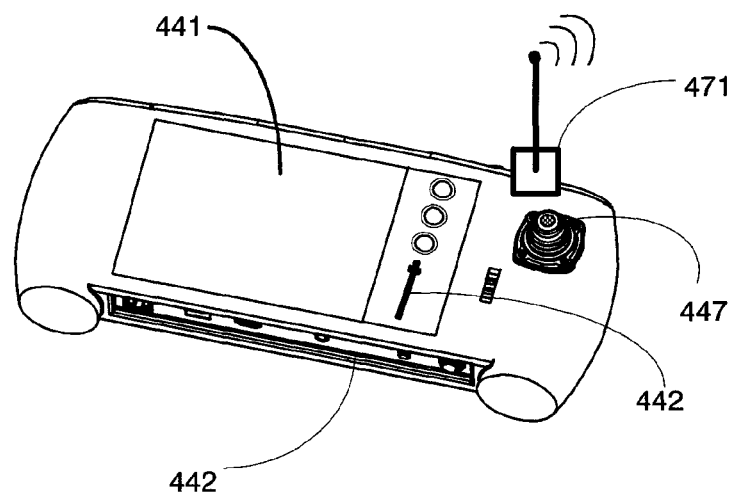

Hardware type control elements may be implemented as buttons, dials, switches, touchpads, scrolling wheels and/or any other known control element designs upon an exterior of an RDVU [142, 242 in FIGS. 1, 2A, 2B, 2C] or as a separate device communicatively coupled to a RDVU (See FIG. 4). According to further embodiments there may be provided one or more physical control elements designed to interact with a GUI rendered on a display of a RDVU.

For example, a RDVU may include a touchpad [141, 241] designed to control a pointer associated with a GUI appearing on a display of a RDVU. According to further embodiments, a RDVU may be controlled from the computational device. According to yet further embodiments, a RDVU may be controlled by a GUI displayed upon a RDVU and interfaced with using one or more control elements upon the computational device or another separate device (e.g. a handheld control unit) (FIG. 4).

According to further embodiments, a RDVU may comprise physical control elements (e.g. buttons, dials, knobs, touchpads, switches, scroll wheels, levers and so on) as in [141, 241], designed to control the operation of a RDVU, an associated GUI and/or associated computational device(s). According to some embodiments a RDVU/ERV may include dedicated control elements for particular functions of the RDVU/Computational device. For example, a RDVU/ERV may include a "take picture" button, a zoom dial or a toggle screen button, etc.

For example, a RDVU may be controlled using the GUI of an associated cellular phone. The GUI of the associated device may displayed upon a RDVU display. Notwithstanding, Such a GUI may still be controlled using the touchscreen of the cellular phone (see FIG. 6). In such an embodiment, a semi-transparent overlay of the user implement (e.g. finger) [609] interacting with the touchscreen may be displayed upon the GUI being displayed on a RDVU.

According to further embodiments, a GUI of an associated device being displayed upon a RDVU display may be controlled using control elements of the RDVU or an associated dedicated control. Such a control may include a touchpad [141, 241], allowing interfacing similar to the actual touchscreen of the associated device. In such embodiments an overlay of the user implement (or other indication of its position—e.g. highlighted icons or highlighted area— see FIG. 6) [607, 608] may be displayed upon the GUI to facilitate its use—i.e. so the user will know where he is positioned on the GUI and which commands he is performing/about to perform. According to further embodiments, such a control element may also include one or more proximity sensors to determine the location of a user implement in proximity to the control element and display this position to the user.

According to yet further embodiments, an associated GUI may be controlled by a joystick [447] or similar control element (e.g. mouse type, arrow pad [246], etc.) which controls a cursor or other type of pointing device (highlighted area—see FIG. 6) on the GUI (see FIG. 1, FIG. 2A 2B 2C 2D, FIG. 3, FIG. 4).

A RDVU may display the GUI of an associated device, its own GUI, and/or a combination of the two. The RDVU may include an option to select the GUI displayed, customize it and/or select hierarchy between control elements/GUIs.

According to some embodiments, a RDVU, or associated device, may include one or more of the control elements directly related to a RDVU features/functions. For example, a RDVU specific control element may be provided for selecting a split screen or picture in picture mode that display views from back and front image sensors. According to some embodiments other display controls (e.g. brightness, contrast, sharpness, colors, etc.) may be part of a RDVU display control.

A set of optical elements [111, 211]—According to some embodiments, a RDVU may include one or more optical elements [111, 211] designed to facilitate viewing of the display of a RDVU, e.g. mirrors, lenses [112, 212], diaphragms, filters [113, 213], etc. The individual lenses [112] (elements), which may come as simple lenses (singlet), doublets and/or triplets and so on.

According to some embodiments the lenses and the different combinations and distances between them, may be configured to: (1) enlarge a particular part of the picture, or all of it, (2) sharpen or focus an image on the screen, (3) zoom in or out, and/or (4) any other optical manipulation of the screen performed by the use of lenses.

For example, a RDVU may include a lens arrangement designed to facilitate the viewing of a full A4 page simultaneously, exactly as if the page were being held in hand in front of a RDVU.

The lenses may be adjusted mechanically, and/or electronically, using any known actuator [114, 214] arrangement, e.g. a track.

An image may be focused by moving the eyepiece nearer and further from the objective, for example, to accommodate users with vision problems. A RDVU may have a focusing mechanism to allow movement of the shaft [114] in which the eyepiece is mounted, without needing to manipulate the eyepiece directly.

According to some embodiments, a RDVU may comprise one or more detachable, interchangeable and/or adjustable optical components. For example, a RDVU may include interchangeable/adjustable optical filters [113].

According to some embodiments a RDVU may include optical filters designed to allow further manipulation and/or modification of the image being viewed. For example, filters may be used to reduce glare. The filters may be manually and/or automatically interchangeable. According to further embodiments, an ERV/RDVU may include shading filters (e.g. sunglass type filters/lenses) which may also become clearer/darker as a function of the lighting.

Sensors—According to some embodiments a RDVU may include sensors:
  a. Mechanical sensors [151, 251] (e.g. accelerometers, inclinometers, etc.). Mechanical sensors may provide positional and movement data/parameters relating to a RDVU/ERV. According to some embodiments, a RDVU/ERV may include image processing circuitry adapted to orient, or otherwise modify, the display of the RDVU/ERV based on the position/orientation of the RDVU/ERV, (e.g. maintaining the image right-side up when the RDVU/ERV is turned/rotated). According to further embodiments, mechanical sensors may be used to determine/calculate the position/orientation of the RDVU/ERV in relation to other devices (e.g. for capturing stereo images). According to yet further embodiments data relating to the movement of a RDVU/ERV may be used to provide for gesture/movement control of the RDVU/ERV (e.g. shacking the RDVU/ERV may cause it to turn on, turning the RDVU/ERV may control focus or zooming, slight tilts may control panning or brightness and so on); i.e. mechanical sensors may be used to provide gesture control of the RDVU/ERV and/or associated computational device.
  b. Environmental sensors [150, 250] (e.g. thermostat, humidity sensors, light sensors, etc.) may provide data/parameters relating to the environment of a RDVU/ERV. According to some embodiments, data from environmental sensors may be used to improve viewing of a RDVU/ERV display and/or may be used to improve photographing using the associated computational device and/or image sensor of a RDVU/ERV;
  c. Image/sound sensors [160, 260]—According to some embodiments, a RDVU/ERV may include one or more image/sound sensors and associated hardware for augmenting the functionalities of an associated computational device. For example, a RDVU/ERV may include an image sensor designed such that an associated computational device can take pictures from the image sensor of a RDVU/ERV.
  d. User eye sensors—according to some embodiments a RDVU/ERV may further comprise one or more sensors adapted to sense physical attributes/motions of an eye of a user of the RDVU/ERV (e.g. a sensor adapted to sense eye-movement/eye-position/winks, etc.). Determined user eye movements, positions, or winks may be used as control signals directed to the RDVU/ERV or an associated computational device. For example, a RDVU/ERV may interpret a user wink as a command to take a picture when in camera mode. According to further embodiments, eye based user input may be configurable by a user.

Mechanical sensors may be used to determine position, orientation, movement and/or location of a RDVU/ERV. Such data may be used to improve the function of the RDVU/ERV (e.g. to orient the display, invert/rotate a camera view/data, position the RDVU/ERV, facilitate augmented reality, adjust settings for movement, etc.) and/or to coordinate the function of the RDVU/ERV with other components. For example, once several RDVU/ERVs and computational devices are watching an interaction of bees and flowers during a certain period of time, there might be pictures and/or videos that may show interaction from several angles in real time. Such image capture may be coordinated using the data from mechanical sensors of one or more of the RDVU/ERVs. In other words, mechanical and/or locational sensor data may be used to coordinate the operation of the RDVU/ERV with other devices (e.g. to film a scene from different angles)

According to yet further embodiments, a RDVU/ERV may comprise sensors for improving/adjusting/controlling its operation and function and/or providing an associated computational device data relevant to its operation (e.g. accelerometers, gyro meters, inclinometers, exterior light sensors, thermometers, etc). For example, a RDVU/ERV may include physical sensors designed to sense a position and an orientation of a RDVU/ERV relative to a computational device, or any other device, or to any other reference, or a level of light in the environment of a RDVU/ERV. According to further embodiments an RDVU/ERV may comprise a microphone that may be used to record audio data and/or for sensing particular audio events (e.g. voice commands, audio cues). Such a microphone/speaker may also be used for communicating via an associated computational device (e.g. making a phone call using an associated smartphone).

Image processing circuitry [170, 270]—According to some embodiments, A RDVU/ERV may include image processing circuitry for processing image information (signals) sensed (e.g. DSP) by a RDVU's image sensors (e.g. CCD, CMOS) and/or received from other devices. A RDVU/ERV image processing circuitry may further be adapted to modify received display data to match a RDVU/ERV display characteristics and/or derive from received display data, a display for rendering upon the RDVU/ERV.

Processing Circuitry [173, 273]—A RDVU/ERV may further include processing circuitry for controlling its operation and/or augmenting its function. Such processing circuitry may, for example, enable, create and/or present augmented reality elements upon the RDVU/ERV display.

Communication circuitry [171, 271]—According to some embodiments, a RDVU/ERV may comprise communication circuitry for communicating with other devices.

Communications between computational devices, cloud, and/or any communicative device and a RDVU/ERV may be via a wired communication link, wireless communication link (e.g. Bluetooth, rf, etc) and/or via a data network.

A mount [131, 231]—According to some embodiments, a RDVU/ERV may include mounting and/or wearing components designed to allow a RDVU/ERV to be worn/positioned in front of a user's eye without holding it and/or mounted in a stationary position. For example, a RDVU/ERV may include a head strap [717].

According to further embodiments an RDVU may include adaptations [734] to allow a RDVU to be positioned on a rod, or a tripod [735] or mounted to glasses [716], or mounted to a user's head by a strap [717]. According to some embodiments a RDVU may include physical connectors for attaching to a mount (e.g. a ring [131, 231] or internal screw thread) that may be a support different ways of mounting a RDVU.

For example, as shown in FIG. 7, an RDVU may be shaped like a viewfinder and include one or more hooks [734, 131, 716] to be hooked from the top of eyeglasses, for example [736]. In another example a RDVU may be connected to an adjustable tripod [735].

Power supply [174, 274]—A RDVU/ERV may comprise a power supply and/or may function on an exterior power supply. According to some embodiments a RDVU may adapted to receive power from an associated computational device (e.g. phone), by wired or wireless power connection and/or may recharge from an associated device.

According to some embodiments a RDVU/ERV may include rechargeable elements. A RDVU/ERV may also use solar energy.

A microphone [180, 280]—According to some embodiments, a RDVU may comprise a microphone for collecting audio data and/or to serve as another environmental sensor. According to some embodiments, a microphone may also allow for audio control of a RDVU.

A speaker and/or an earphone plug [181, 281, 282]—According to some embodiments, a RDVU may comprise a speaker and/or earphone plug.

A memory/data storage—According to some embodiments, a RDVU/ERV may include a memory/data storage, which may function as a buffer and/or be used for local storage.

An image sensor [160, 260]—According to some embodiments a RDVU/ERV may include image sensors and/or light elements. A RDVU/ERV image sensor may be used in place of, to augment, and/or in conjunction with image sensors of associated computational devices. According to some embodiments a RDVU/ERV's camera and flashlight may add a view, additional, or standalone, to the views detected from an associated device. in other words, an image sensor of a RDVU/ERV may be used to take pictures/video for an associated computational device.

According to some embodiments, a RDVU may be configured in other forms including a display and a shading element (or other adaptation for mitigating glare). For example:

a. a screen/display may be mounted on a handheld device, with a shading element (e.g. visor) (FIG. 2A). As can be seen in this figure such a RDVU may resemble a PDA wearing a baseball cap's visor's [215], or may be smaller. For example, such a RDVU may be designed like a baseball card (See FIG. 2B) with a visor [215] or maybe even smaller (e.g. a few inch screen [210] (e.g. 1-3 inch screen)) with a covering element [218]. In such embodiments the shading element may fold onto the screen when not in use. Such RDVUs may even be wrist mounted (See FIG. 2D)—like a watch with a cover [218] that opens into a visor for the screen. According to further such embodiments, the shading element may further include side and/or bottom shading elements [215]. In other words, a shading element of a RDVU may shade the display from 1, 2, 3 or 4 sides. Further, one or more of the shading elements may be foldable or detachable. According to further embodiments, a shading element may be part of a case/cover of the RDVU and/or associated computational device;

b. a binocular type arrangement (FIG. 2C). As can be seen in FIG. 2C, such RDVUs may resemble two ERVs combined by a bridge. In such RDVUs, other elements of the RDVU (e.g. control elements [240,241,242], sensors [250,251], power supply [274]) may be mounted on the cylinders and/or on the bridge; A binocular shape which may have more than one display [210,210] that may be arranged in different ways for example, in a panoramic setup. According to some embodiments, the binocular may have multiple cameras [260,260] which may combine its captured data, with other devices on the network to create, the desired presentation. A binocular may have an interface [240] that may comprise physical [242] and digital control elements, possibly through the touch pad [241], which may be located on the bridge between the two barrel-like tubes that create a binocular. An interface may comprise a touch pad [241] including proximity sensors, so that when hovering above it with a finger, or moving the finger on it will move a cursor (See FIG. 6), or other graphical icon, on a binocular's screen and may assist in controlling a RDVU. The binocular type may be held by hands, may be mounted on to a tripod to glasses and/or to a bar to be held in hand, like glasses were once held. Similarly, an interface may include an arrow pad [246] for controlling such a cursor.

c. glasses or an accessory adapted to fit onto eye-glasses [736]; and/or d. an ERV shape attached to glasses on one eye, or two, with a hinge attachable to the upper side of a pair of glasses. The hinge pivot may provide an option of raising the ERV from the glasses' lens when not in use.

e. any other suitable physical form.

According to some embodiments, a RDVU/ERV may have a remote control/separate interface unit (See FIG. 4), which may be hand held. Such a remote/separate unit may communicate with the RDVU/ERV wirelessly or via a wired connection using any known communication technology. According to further embodiments a remote/separate unit may communicate with the RDVU/ERV via a network.

An ERV/RDVU may be functionally associated with ancillary hardware for facilitating its function. For example, an ERV may be functionally associated with an exterior interface unit (e.g. remote control—See FIG. 4), Such a remote may include one or more control elements [442] for interfacing-with/controlling an ERV and/or other associated computational devices. Such a remote control may function in conjunction with a GUI displayed on the associated RDVU and/or computational device [441]. Such a remote unit may, in some embodiments, be designed to be worn, e.g. as a wristwatch [432] or necklace, etc. It should be understood that the present invention, on its three major components (e.g. the computational device, a RDVU and the separate command device) See FIG. 3, may be implemented in any configuration, interchangeably. For the sake of convenience, the descriptions herein refer to a computational device controlled by a RDVU and/or a separate command device. Further, any number of these components may operate in communication and/or cooperation with each other, possibly in a networked configuration. These descriptions, however, should be understood to equally relate, with the relevant modifications, to any hierarchical structure among the three.

An ERV may further include a camera [160], a flash and/or flashlight [162] on the outside side of the display. An ERV may further include a mount option on its surface end, for example, a ring shape [131]. An ERV may further include an interface control panel mounted on its outside surface [140].

A RDVU may include augmented reality functionalities. Augmented reality may be generated by processing circuitry [173] of a RDVU [274], by processing circuitry of an associated computational device, a cloud based service and/or any combination thereof.

According to some embodiments, a RDVU may be adapted to communicate/pair with one or more associated computational devices (e.g. smartphones) and receive from the devices image data of the devices' native display and/or portions thereof.

A RDVU may render the image data, portions thereof or images derived from the data upon its display. According to some embodiments, the computational device's (e.g. smartphone) screen may be deactivated as a RDVU is activated or placed upon the eye. According to further embodiments, an associated computational device may send a RDVU image data of a display intended only for a RDVU while the display of the computational device remains normal. For example, a RDVU screen may display a camera view while an associated cellphone remains on its home page.

According to some embodiments, the computational device may recognize a RDVU upon connection (P&P) and may further automatically deactivate the device's display.

According to some embodiments, a RDVU may thus be used to facilitate use of the associated computational device and/or for the capture of media (e.g. pictures, videos, audio recordings, etc) using the sensors of the associated computational device and/or RDVU, by providing improved visibility of associated displays and interfacing functionalities. Therefore, during use of a RDVU, the RDVU and any associated computational devices may be controlled by combinations of one or more of:

a. physical control elements upon the RDVU [142, 242];

according to some embodiments, a RDVU may include physical control elements for controlling one or more functions of the RDVU and/or associated computational device. Such physical control elements may include any form of control element (e.g. buttons, switches, dials, knobs, wheels, etc.) and may be dedicated to a particular function (e.g. volume, brightness, on/off, mode selector, etc) or may be configurable to user selection. Physical control elements upon the RDVU may control functions of the RDVU and/or functions of an associated computational device. According to further embodiments, physical control elements on the RDVU may be used to control/interact-with an associated GUI, as further explained below;

b. physical control elements upon an associated control device (remote);

according to some embodiments, an associated remote control device may include physical control elements for controlling one or more functions of the RDVU and/or associated computational device. Such physical control elements may include any form of control element (e.g. buttons, switches, dials, knobs, wheels, etc.) and may be dedicated to a particular function (e.g. volume, brightness, on/off, mode selector, etc) or may be configurable to user selection. Physical control elements upon the remote control device may control functions of the RDVU and/or functions of an associated computational device. According to further embodiments, physical control elements on the remote control device may be used to control/interact-with an associated GUI, as further explained below;

c. physical control elements of the associated computational device;

according to some embodiments, physical control elements upon an associated computational device may continue to function normally and/or function in a unique configuration (e.g. with RDVU functions added in) and/or deactivate when an associated RDVU is in operation. For example, volume control buttons on an associated smartphone may continue to function when a RDVU associated with the smartphone is activated and may yet further, also control the volume of the RDVU speakers. Physical control elements upon the associated computational device may control functions of the RDVU and/or functions of the associated computational device. According to further embodiments, physical control elements on the associated computational device may be used to control/interact-with an associated GUI, as further explained below;

d. a graphical user interface (GUI) of the associated computational device displayed upon the display of the computational device;

according to some embodiments, a GUI of an associated computational device may continue to function normally and/or function in a unique configuration (e.g. with RDVU functions added in) and/or deactivate when an associated RDVU is in operation. The device GUI may operate in conjunction and/or alternatingly with other GUIs described below. In other words, a user may still be able to operate his/her smartphone normally, using the regular GUI (e.g. touchscreen), when a RDVU associated with it is in operation and includes another GUI for interacting with the smartphone. According to some embodiments, the regular GUI may deactivate, leaving control only through the RDVU GUI. According to other embodiments, the regular GUI may change during RDVU operation or become limited to certain functions (e.g. phone answering remains active while other functionalities are deactivated). The GUIs may also be integrated to one GUI appearing on both or one of the displays.

e. a GUI of the associated computational device displayed upon the display of the RDVU;

according to some embodiments, a GUI of a computational device, or a portion thereof, may be displayed upon the display of an associated RDVU. In other words, a user of a computational device may be able to view the GUI of the device upon the display of an associated RDVU. According to some embodiments, a GUI displayed on a RDVU, may include an indication of a current location of a control object/implement (e.g. user's finger) in relation to the GUI, as shown in FIG. 6. As can be seen in [609], the indication may be an overlay/semi-transparent image of the control object/implement itself, or it may be a mere indication of its location (e.g. a highlighted area, cursor, lighted/colored dot or similar), as shown in FIG. 6.

a number of options are contemplated for the interaction between a user and a GUI in which the area being touched by the user is not the display being viewed, such as is the case herein, when viewing the GUI upon a display of the RDVU while interacting with it using a control element upon the exterior of the RDVU, on the associated computational device and/or upon a remote control device. It should be understood that any of the below options may be implemented in relation to control elements upon the exterior of the RDVU, on the associated computational device, upon a remote control device and/or upon another networked device:

i. option of proximity sensor—in embodiments in which the GUI is controlled by a touchpad or touchscreen, there may be provided proximity sensors of any technology, designed to determine the position of a control element/object in relation to the touchpad or touchscreen and accordingly render an indication of the location of the control element in relation to the GUI upon the GUI display (e.g. the above described finger overlay and/or highlighted area/point);
  ii. option of "negative" touchscreen—a "negative" touchscreen/touchpad is activated by the finger/control implement being removed (discontacting) the surface of the touchscreen/touchpad. In order to use such a touchscreen/touchpad the user places his finger/implement in contact with the touchscreen/touchpad. The area in contact is immediately highlighted/indicated [607]. As the finger/implement is moved on the touchscreen/touchpad, the area/point highlighted/indicated moves with it. Upon removing the finger/implement from the touchscreen/touchpad (discontinuing contact), the last area/point highlighted/indicated is selected (exactly the same as if the user were to touch his finger to that point on a normal (positive) touchscreen/touchpad). Clearly, using a "negative" touchscreen/touchpad, the user can easily view the GUI on a display other than the touchscreen/touchpad being used. The user will first put his finger/control object in contact with the touchscreen/touchpad. The respective point/area of the GUI will be highlighted/indicated. The user can then move the implement/finger on the touchscreen/touchpad until the desired point on the GUI is highlighted/indicated. At this point the user removes the finger/implement from the touchscreen/touchpad (discontinues contact), thereby selecting the desired point (icon) on the GUI;
  iii. the arrow/joystick/mouse option—an indicator/cursor upon the associated display of the GUI may be controlled by a physical controller (e.g. mouse, touchpad, arrow buttons, joystick, and/or any other suitable control element) to move the indicator/cursor to points/elements on the GUI (e.g. icons). An actuating action upon the control element (e.g. pushing the joystick or tapping/double-tapping on a touch pad) and/or associated buttons may serve to select or otherwise invoke the elements of the GUI upon which the cursor/indicator is currently located. For example, a user may move a highlighted point [607] around on his smartphone GUI (being viewed through the RDVU) using a touchpad on the RDVU and select an icon by tapping on the touchpad. The highlighted point may also show on the phone display or may only show on the RDVU display. Similarly, upon the GUI one icon/control-element may be highlighted at each point in time, wherein an associated control element (e.g. joystick, arrowpad, etc.) may switch the icon being highlighted (i.e. currently selected/selectable), as shown in FIG. 6;
  iv. any other option of controlling a GUI displayed upon a RDVU using control elements upon the RDVU, upon a separate remote control device and/or upon an associated computational device may be used.
 f. a GUI of the RDVU displayed upon the display of the computational device;

as noted above, a GUI of a computational device associated with a RDVU may be modified to include control elements for control of the RDVU (e.g. an RDVU settings icon and associated selectable menu, RDVU brightness/volume control, a split picture/PIP icon and so on)

g. a GUI of the RDVU displayed upon the display of the RDVU;

a GUI displayed upon a display of the RDVU may include control elements for controlling the operation of the RDVU (e.g. an RDVU settings icon and associated selectable menu). The RDVU GUI may be displayed/enacted in combination with a GUI of an associated computational device, alternating with the other GUI or in separate areas (e.g. RDVU control elements on a bar at the bottom of the RDVU screen). According to some embodiments, a RDVU may include a control element for switching between modes of the GUI of the RDVU (e.g. mode a—only computational device GUI, mode b—only RDVU GUI, mode c—both GUI's, mode d—RDVU GUI+camera of computational device view and GUI, and so on).

h. a combined GUI of the associated computational device and RDVU Displayed Upon the Display of the Computational Device as suggested above, control elements associated with control of the operation of a RDVU may be added or otherwise integrated into a GUI of the device itself. For example, the GUI of a smartphone may include icons for activating and controlling RDVUs associated with the phone.

i. a combined GUI of the associated computational device and RDVU displayed upon the display of the RDVU;

as also suggested above, a RDVU, may display a GUI of an associated computational device, or a portion thereof. As further suggested, the display of the associated device GUI kay be augmented/supplemented with control elements for control of the RDVU, separately or in conjunction;

j. each and any of the above mentioned GUIs may be interacted with:
   i. using hardware of the associated computational device (e.g. a touchscreen of an associated smartphone);
   ii. using hardware of the RDVU (e.g. a touchpad or arrow keys on the RDVU); and/or
   iii. using hardware of an associated remote control.
 k. controlled by other devices communicatively coupled to the RDVU and/or an associated computational device;

as described above, more than one computational device may be associated with a single RDVU and more than one RDVU may be associated with a single device or with each other. In such embodiments, one GUI may control more than one device and/or an integrated or semi-integrated GUI may be used to control the devices and/or the coordination of their functions.

According to some embodiments, the connection/activation of a RDVU to a given device may cause the given device to activate particular functions/applications/operating modes and associate it with a RDVU. For example, connection/activation of a RDVU may cause the activation of the device's camera function and what usually appears on the computational device's screen, will show on a RDVU screen utilizing its adjustable setup, for example, increased, with colors filtered etc.

According to some embodiments, a RDVU may be activated automatically, semi automatically and/or manually. Activities may set in sets, for example once the camera is activated, the microphone will be activated and so will the display. Set activities may still allow a direct control on each feature.

The set of controls of a computational device associated with a RDVU, or portions thereof, may remain active, may be modified and/or may be deactivated upon activation of an RDVU. For example a RDVU might deactivate the camera icon while gaining control of it, taking pictures with direct command from a RDVU.

According to some embodiments, the computational device's control, or a portion thereof, may show, with or without other RDVU control elements, possibly in a GUI form.

A computational device might be associated with one/or more RDVUs and one or more computational devices may be associated with one or more RDVUs. For example, using a split screen or picture in picture may present images from several associated devices.

A RDVU may include document viewing functionalities. Such functionalities may include a display designed to conveniently display a full sized page, a relatively large portion of a page, or another display particularly suited for reading (e.g. backlight, whitepaper, book view, etc.) which may allow a reader to complete reading the page without scrolling, with minimal scrolling or only vertical scrolling, similar to reading from a large screen or may be similar to reading from a product like Kindle™.

A RDVU may include webpage viewing functionalities. Such functionalities may include a display designed to conveniently display a full sized webpage, a relatively large portion of a webpage, or another display particularly suited for webpage viewing (e.g. particularly wide screen) which may enable the reader to review the page without scrolling, similar to viewing a webpage on a large screen.

According to some embodiments a RDVU may be adapted to provide multiple different viewing formats for viewing one or more different displays. Viewing formats may include split screen, picture in picture, document viewing mode, webpage viewing mode, augmented reality, overlay of one or more displays (or portions thereof) upon one or more other displays. The information to be displayed may be received from multiple sources—i.e. multiple associated computational devices and/or one or more computational devices and image sensors of the RDVU itself.

Reference is now made to FIG. 5. According to further embodiments, a RDVU may be adapted to present multiple displays simultaneously (e.g. Display A and Display B in the FIG. 5), in parallel or in conjunction. Multiple displays may be presented in parallel by splitting a screen to two or more smaller screens (i.e. split screen—[516]), by displaying one or more displays on top of one another (i.e. picture in picture—[519], or as a semi-transparent overlay), and/or by alternating displays (i.e. toggling between displays by use of a control element).

In such embodiments, multiple displays may include:

a. Displays from two or more associated devices.—As described above, a RDVU/ERV may be associated with more than one computational device. In such cases, a multiple display function may be used to view displays from multiple devices in parallel;

b. Different types of displays from a computational device—more than one display may be associated with different functionalities/functions of a particular device. For example, a computational device may browse the web while enabling camera functionality. In such a situation, an associated RDVU/ERV may display a camera view in parallel to a display of a webpage being viewed. In another example, a GUI of an associated device may be displayed in parallel to a camera view (e.g. the GUI may be a smaller picture within the display of the camera view or vice versa).

c. Multiple displays of a similar type may be displayed in parallel—an associated computational device may be adapted to present more than one display, which a RDVU/ERV may display in parallel. For example, a computational device may be adapted to browse multiple webpages simultaneously, and an associated RDVU/ERV may display the multiple webpages concurrently (e.g. side by side). In a further example, an RDVU/ERV may simultaneously display front and rear camera views and an associated RDVU/ERV may display the multiple webpages concurrently (e.g. side by side).

d. Displays may display one view from an RDVU/ERV's camera and one from the computational device, whereas may be displayed in multiple displays, or in a picture within a picture, providing the user to select which one will be in the larger display.

e. The GUI interfaces, of the RDVU/ERV and/or the computational device, or any other device on its network may be displayed in separate displays or in overlay format providing the user access to all of them.

The invention claimed is:

1. A handheld remote viewing device for viewing a replicate of a native Graphic User Interface (GUI) of an associated cellular phone, said viewing device comprising:

an enclosed housing;

a display residing within said housing;

an aperture in said housing configured and positioned to allow a user to view said display in isolation from exterior lighting, from outside the housing;

one or more user control elements positioned on the exterior of said housing and adapted to interact with the native GUI, wherein the native GUI includes a current camera view of the associated cellular phone and said user control elements include a user control element adapted to cause the cellular phone to take a picture;

communication circuitry adapted to communicate with the associated cellular phone and receive from the cellular phone-image data of the native GUI of the cellular phone; image rendering circuitry adapted to render upon said display the replicate of the native GUI of the cellular phone; and wherein, apart from said aperture, said housing isolates said display from exterior light.

2. The device according to claim 1, wherein said housing has a tubular shape and said aperture is located at one end of the tube.

3. The device according to claim 1, further comprising one or more lenses or optical filters positioned between said aperture and said display.

4. The device according to claim 1, wherein said image rendering circuitry is further adapted to render upon said display an indication upon the replicate GUI of a current position of a control element in relation to graphical elements of the GUI.

5. The device according to claim 1, wherein said image rendering circuitry is further adapted to render upon said display an indication upon the replicate GUI of a control element or area of the GUI currently selectable.

6. The device according to claim 1, further comprising a touchpad upon the exterior of said housing adapted to interact with the replicate GUI.

7. The device according to claim 4, wherein the indication is a semi-transparent overlay upon the display.

8. The device according to claim 1, further comprising a speaker and microphone adapted to function as a speaker and microphone of the cellular phone during a phone call.

9. The device according to claim 1, further comprising an image sensor adapted to capture images.

10. A handheld remote viewing device for viewing a camera view of an associated cellular phone, said viewing device comprising:
   an enclosed housing;
   a display residing within said housing;
   an aperture in said housing configured and positioned to allow a user to view said display in isolation from exterior lighting, from outside the housing;
   communication circuitry adapted to communicate with the associated cellular phone and receive from the cellular phone a current view of a camera of the cellular phone;
   image rendering circuitry adapted to render upon said display the current view of the camera of the cellular phone; and
   a control element upon said housing adapted to cause the cellular phone to take a picture;
   wherein, apart from said aperture, said housing isolates said display from exterior light.

11. The device according to claim 10, further comprising user control elements, wherein said image rendering circuitry is further adapted to render upon said display at least a portion of a native graphical user interface (GUI) of the cellular phone and said user control elements are adapted to interact with the GUI.

12. The device according to claim 11, wherein said image rendering circuitry is further adapted to render upon said display an indication upon the GUI of a current position of a control element in relation to graphical elements of the GUI or a currently selectable area or control element of the GUI.

13. The device according to claim 10, wherein said housing has a tubular shape and said aperture is located at one end of the tube.

14. A system for viewing a replicate of a native Graphic User Interface (GUI) of an associated cellular phone, said system comprising:
   a handheld remote viewing device for viewing a replicate of a native Graphic User Interface (GUI) of an associated cellular phone, said viewing device comprising:
      an enclosed housing;
      a display residing within said housing;
      an aperture in said housing configured and positioned to allow a user to view said display in isolation from exterior lighting, from outside the housing;
      one or more user control elements positioned on the exterior of said housing and adapted to interact with the native GUI, wherein the native GUI includes a current camera view of the associated cellular phone and said user control elements include a user control element adapted to cause the cellular phone to take a picture;
      communication circuitry adapted to communicate with the associated cellular phone and receive from the cellular phone image data relating of the native GUI of the cellular phone; and
      image rendering circuitry adapted to render upon said display the replicate of the native GUI of the cellular phone;
      wherein, apart from said aperture, said housing isolates said display from exterior light; and
   a handheld user interface unit separate from said handheld remote viewing device, said user interface unit comprising,
      user control elements; and
      communication circuitry adapted to communicate with said handheld remote viewing device and send control signals to said handheld remote viewing device.

15. The system according to claim 14, wherein said housing has a tubular shape and said aperture is located at one end of the tube.

* * * * *